(12) United States Patent
Sakhnini et al.

(10) Patent No.: US 12,328,744 B2
(45) Date of Patent: Jun. 10, 2025

(54) DOWNLINK CONTROL INFORMATION FOR LICENSED AND UNLICENSED NEW RADIO

(71) Applicant: QUALCOMM Incorporated, San Diego, CA (US)

(72) Inventors: Iyab Issam Sakhnini, San Diego, CA (US); Jing Sun, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/662,112

(22) Filed: May 5, 2022

(65) Prior Publication Data

US 2022/0377794 A1 Nov. 24, 2022

Related U.S. Application Data

(60) Provisional application No. 63/201,933, filed on May 19, 2021.

(51) Int. Cl.

| | | |
|---|---|---|
| H04W 72/0453 | (2023.01) | |
| H04W 72/231 | (2023.01) | |
| H04W 72/232 | (2023.01) | |
| H04W 74/00 | (2009.01) | |
| H04W 74/08 | (2024.01) | |
| H04W 74/0816 | (2024.01) | |
| H04W 84/02 | (2009.01) | |
| H04W 88/02 | (2009.01) | |
| H04W 88/08 | (2009.01) | |
| H04W 92/02 | (2009.01) | |
| H04W 92/10 | (2009.01) | |

(52) U.S. Cl.
CPC ..... *H04W 72/232* (2023.01); *H04W 72/0453* (2013.01); *H04W 72/231* (2023.01); *H04W 74/006* (2013.01); *H04W 74/0816* (2013.01); *H04W 74/0866* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ... H04W 48/02–20; H04W 72/02–569; H04W 74/002–0891; H04W 84/02–16; H04W 88/02–12; H04W 92/02–04; H04W 92/10
See application file for complete search history.

(56) References Cited

U.S. PATENT DOCUMENTS

| | | | | |
|---|---|---|---|---|
| 2019/0059057 | A1* | 2/2019 | Peng | H04W 72/23 |
| 2020/0128621 | A1* | 4/2020 | Chang | H04W 72/23 |
| 2020/0267730 | A1* | 8/2020 | Kim | H04W 72/23 |
| 2022/0394751 | A1* | 12/2022 | Myung | H04W 72/232 |
| 2023/0371039 | A1* | 11/2023 | Tsai | H04W 72/232 |

* cited by examiner

*Primary Examiner* — Timothy J Weidner
(74) *Attorney, Agent, or Firm* — Harrity & Harrity, LLP

(57) ABSTRACT

Various aspects of the present disclosure generally relate to wireless communication. In some aspects, a user equipment (UE) may receive a first downlink control information (DCI) for New Radio (NR) licensed operation and receive a second DCI for NR unlicensed operation, where the second DCI received for NR unlicensed operation is a same length as the first DCI received for NR licensed operation. Numerous other aspects are described.

19 Claims, 14 Drawing Sheets

DOWNLINK CONTROL INFORMATION FOR LICENSED AND UNLICENSED NEW RADIO

CROSS-REFERENCE TO RELATED APPLICATION

This Patent Application claims priority to U.S. Provisional Patent Application No. 63/201,933, filed on May 19, 2021, entitled "DOWNLINK CONTROL INFORMATION FOR LICENSED AND UNLICENSED NEW RADIO," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using downlink control information for New Radio (NR) licensed and NR unlicensed in high frequency bands.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, for New Radio (NR) licensed operation, downlink control information (DCI) that includes one or more bits for listen before talk (LBT). The method may include transmitting, without performing an LBT procedure, a communication based at least in part on the DCI.

In some aspects, a method of wireless communication performed by a network entity includes generating, for NR licensed operation, DCI that includes one or more bits for LBT. The method may include transmitting the DCI to a UE.

In some aspects, a method of wireless communication performed by a UE includes obtaining information that indicates whether the UE is to operate in NR licensed mode or NR unlicensed mode and receiving DCI without LBT bits. The method may include performing, in connection with receiving the DCI, an LBT procedure if the information indicates that the UE is to operate in NR unlicensed mode, and transmitting a communication based at least in part on the DCI.

In some aspects, a method of wireless communication performed by a network entity includes transmitting, to a UE, DCI without LBT bits, and receiving, in NR unlicensed operation, a communication based at least in part on the DCI.

In some aspects, a method of wireless communication performed by a UE includes monitoring for DCI of a first length that includes one or more bits for LBT and for DCI of a second length that does not include LBT bits, if the UE is configured to monitor for a system information radio network temporary identifier (SI-RNTI). The method may include receiving DCI, performing an LBT procedure if the received DCI includes the one or more LBT bits, and transmitting a communication based at least in part on the received DCI.

In some aspects, a UE for wireless communication includes a memory and one or more processors, coupled to the memory, configured to receive, for NR licensed operation, DCI that includes one or more bits for LBT, and transmit, without performing an LBT procedure, a communication based at least in part on the DCI.

In some aspects, a network entity for wireless communication includes a memory and one or more processors, coupled to the memory, configured to generate, for NR licensed operation, DCI that includes one or more bits for LBT, and transmit the DCI to a UE.

In some aspects, a UE for wireless communication includes a memory and one or more processors, coupled to the memory, configured to obtain information that indicates whether the UE is to operate in NR licensed mode or NR unlicensed mode, receive DCI without LBT bits, perform, in connection with receiving the DCI, an LBT procedure if the information indicates that the UE is to operate in NR unlicensed mode, and transmit a communication based at least in part on the DCI.

In some aspects, a network entity for wireless communication includes a memory and one or more processors, coupled to the memory, configured to transmit, to a UE, DCI without LBT bits, and receive, in NR unlicensed operation, a communication based at least in part on the DCI.

In some aspects, a UE for wireless communication includes a memory and one or more processors, coupled to the memory, configured to monitor for DCI of a first length that includes one or more bits for LBT and for DCI of a second length that does not include LBT bits, if the UE is configured to monitor for an SI-RNTI, receive DCI, perform an LBT procedure if the received DCI includes the one or more LBT bits, and transmit a communication based at least in part on the received DCI.

In some aspects, a non-transitory computer-readable medium storing a set of instructions for wireless communication includes one or more instructions that, when executed by one or more processors of a UE, cause the UE to receive, for NR licensed operation, DCI that includes one or more bits for LBT, and transmit, without performing an LBT procedure, a communication based at least in part on the DCI.

In some aspects, a non-transitory computer-readable medium storing a set of instructions for wireless communication includes one or more instructions that, when executed by one or more processors of a network entity, cause the network entity to generate, for NR licensed operation, DCI that includes one or more bits for LBT, and transmit the DCI to a UE.

In some aspects, a non-transitory computer-readable medium storing a set of instructions for wireless communication includes one or more instructions that, when executed by one or more processors of an UE, cause the UE to obtain information that indicates whether the UE is to operate in NR licensed mode or NR unlicensed mode, receive DCI without LBT bits, perform, in connection with receiving the DCI, an LBT procedure if the information indicates that the UE is to operate in NR unlicensed mode, and transmit a communication based at least in part on the DCI.

In some aspects, a non-transitory computer-readable medium storing a set of instructions for wireless communication includes one or more instructions that, when executed by one or more processors of a network entity, cause the network entity to transmit, to a UE, DCI without LBT bits, and receive, in NR unlicensed operation, a communication based at least in part on the DCI.

In some aspects, a non-transitory computer-readable medium storing a set of instructions for wireless communication includes one or more instructions that, when executed by one or more processors of an UE, cause the UE to monitor for DCI of a first length that includes one or more bits for LBT and for DCI of a second length that does not include LBT bits, if the UE is configured to monitor for an SI-RNTI, receive DCI, perform an LBT procedure if the received DCI includes the one or more LBT bits, and transmit a communication based at least in part on the received DCI.

In some aspects, an apparatus for wireless communication includes means for receiving, for NR licensed operation, DCI that includes one or more bits for LBT, and means for transmitting, without performing an LBT procedure, a communication based at least in part on the DCI.

In some aspects, an apparatus for wireless communication includes means for generating, for NR licensed operation, DCI that includes one or more bits for LBT, and means for transmitting the DCI to a UE.

In some aspects, an apparatus for wireless communication includes means for obtaining information that indicates whether the apparatus is to operate in NR licensed mode or NR unlicensed mode, means for receiving DCI without LBT bits, means for performing, in connection with receiving the DCI, an LBT procedure if the information indicates that the apparatus is to operate in NR unlicensed mode, and means for transmitting a communication based at least in part on the DCI.

In some aspects, an apparatus for wireless communication includes means for transmitting, to a UE, DCI without LBT bits, and means for receiving, in NR unlicensed operation, a communication based at least in part on the DCI.

In some aspects, an apparatus for wireless communication includes means for monitoring for DCI of a first length that includes one or more bits for LBT and for DCI of a second length that does not include LBT bits, if the apparatus is configured to monitor for an SI-RNTI, means for receiving DCI, means for performing an LBT procedure if the received DCI includes the one or more LBT bits, and means for transmitting a communication based at least in part on the received DCI.

Some aspects described herein relate to a method of wireless communication performed by a UE. The method may include receiving a first DCI for NR licensed operation. The method may include receiving a second DCI for NR unlicensed operation, where the second DCI received for NR unlicensed operation is a same length as the first DCI received for NR licensed operation. The method may include transmitting, without performing an LBT procedure, a communication based at least in part on the first DCI.

Some aspects described herein relate to a method of wireless communication performed by a network entity. The method may include generating a first DCI for NR licensed operation by extending a length of the first DCI to be a same length as a second DCI that is used for NR unlicensed operation. The method may include transmitting the first DCI to a UE.

Some aspects described herein relate to a UE for wireless communication. The UE may include a memory and one or more processors coupled to the memory. The one or more processors may be configured to receive a first DCI for NR licensed operation. The one or more processors may be configured to receive a second DCI for NR unlicensed operation, where the second DCI received for NR unlicensed operation is a same length as the first DCI received for NR licensed operation. The one or more processors may be configured to transmit, without performing an LBT procedure, a communication based at least in part on the first DCI.

Some aspects described herein relate to a network entity for wireless communication. The network entity may include a memory and one or more processors coupled to the memory. The one or more processors may be configured to generate a first DCI for NR licensed operation by extending a length of the first DCI to be a same length as a second DCI that is used for NR unlicensed operation. The one or more processors may be configured to transmit the first DCI to a UE.

Some aspects described herein relate to a non-transitory computer-readable medium that stores a set of instructions for wireless communication by a UE. The set of instructions, when executed by one or more processors of the UE, may cause the UE to receive a first DCI for NR licensed operation. The set of instructions, when executed by one or more processors of the UE, may cause the UE to receive a second DCI for NR unlicensed operation, where the second DCI received for NR unlicensed operation is a same length as the first DCI received for NR licensed operation. The set of instructions, when executed by one or more processors of the UE, may cause the UE to transmit, without performing an LBT procedure, a communication based at least in part on the first DCI.

Some aspects described herein relate to a non-transitory computer-readable medium that stores a set of instructions for wireless communication by a network entity. The set of instructions, when executed by one or more processors of the network entity, may cause the network entity to generate a first DCI for NR licensed operation by extending a length of the first DCI to be a same length as a second DCI that is used for NR unlicensed operation. The set of instructions, when executed by one or more processors of the network entity, may cause the network entity to transmit the first DCI to a UE.

Some aspects described herein relate to an apparatus for wireless communication. The apparatus may include means for receiving a first DCI for NR licensed operation. The apparatus may include means for receiving a second DCI for NR unlicensed operation, where the second DCI received for NR unlicensed operation is a same length as the first DCI received for NR licensed operation. The apparatus may include means for transmitting, without performing an LBT procedure, a communication based at least in part on the first DCI.

Some aspects described herein relate to an apparatus for wireless communication. The apparatus may include means for generating a first DCI for NR licensed operation by extending a length of the first DCI to be a same length as a second DCI that is used for NR unlicensed operation. The apparatus may include means for transmitting the first DCI to a UE.

Aspects generally include a method, apparatus, system, computer program product, non-transitory computer-readable medium, user equipment, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
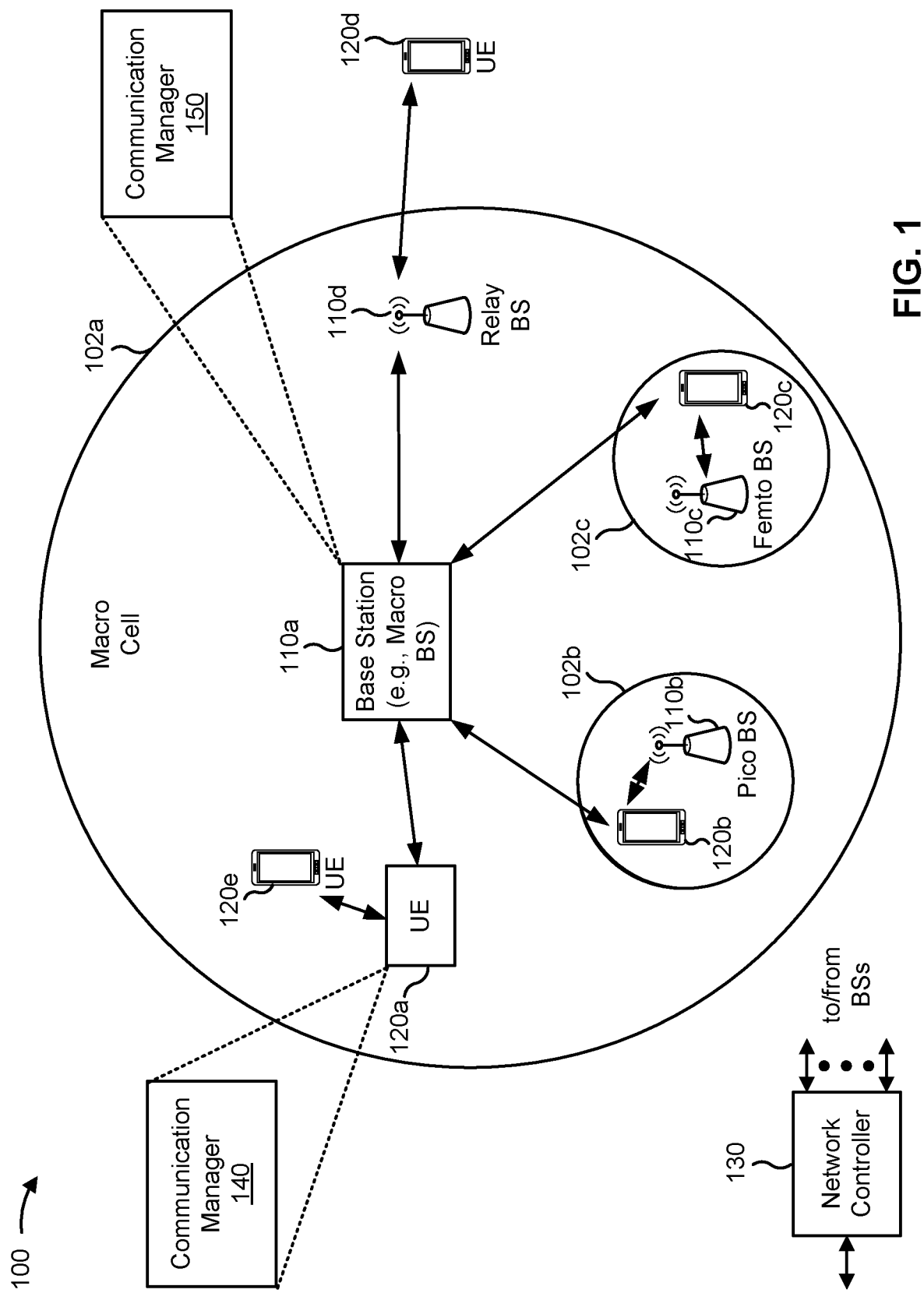
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may receive, for NR licensed operation, downlink control information (DCI) that includes one or more bits for listen before talk (LBT). The communication manager 140 may transmit, without performing an LBT procedure, a communication based at least in part on the DCI.

In some aspects, a network entity (e.g., base station 110) may include a communication manager 150. As described in more detail elsewhere herein, the communication manager 150 may generate, for NR licensed operation, DCI that includes one or more bits for LBT, and transmit the DCI to a UE.

In some aspects, the UE 120 may include a communication manager 140. As described in more detail elsewhere herein, the communication manager 140 may obtain information that indicates whether the UE is to operate in NR licensed mode or NR unlicensed mode and receive DCI without LBT bits. The communication manager 140 may perform, in connection with receiving the DCI, an LBT procedure if the information indicates that the UE is to operate in NR unlicensed mode, and transmit a communication based at least in part on the DCI.

In some aspects, the network entity may include a communication manager 150. As described in more detail elsewhere herein, the communication manager 150 may transmit, to a UE, DCI without LBT bits, and receive, in NR unlicensed operation, a communication based at least in part on the DCI.

In some aspects, the UE 120 may include a communication manager 140. As described in more detail elsewhere herein, the communication manager 140 may monitor for DCI of a first length that includes one or more bits for LBT and for DCI of a second length that does not include LBT bits, if the UE is configured to monitor for a system information radio network temporary identifier (SI-RNTI). The communication manager 140 may receive DCI, perform an LBT procedure if the received DCI includes the one or more LBT bits, and transmit a communication based at least in part on the received DCI.

In some aspects, the communication manager 140 may receive a first DCI for NR licensed operation and receive a second DCI for unlicensed operation (e.g., NR unlicensed operation), where the second DCI received for NR unlicensed operation is a same length as the first DCI received for NR licensed operation. The communication manager 140 may transmit, without performing an LBT procedure, a communication based at least in part on the first DCI.

Additionally, or alternatively, the communication manager 140 may perform one or more other operations described herein.

In some aspects, the communication manager 150 may generate a first DCI for NR licensed operation by extending a length of the first DCI to be a same length as a second DCI that is used for NR unlicensed operation and transmit the first DCI to UE. Additionally, or alternatively, the communication manager 150 may perform one or more other operations described herein.

As indicated above, FIG. 1 is provided as an example. Other examples may differ from what is described with regard to FIG. 1.

Figure 2:
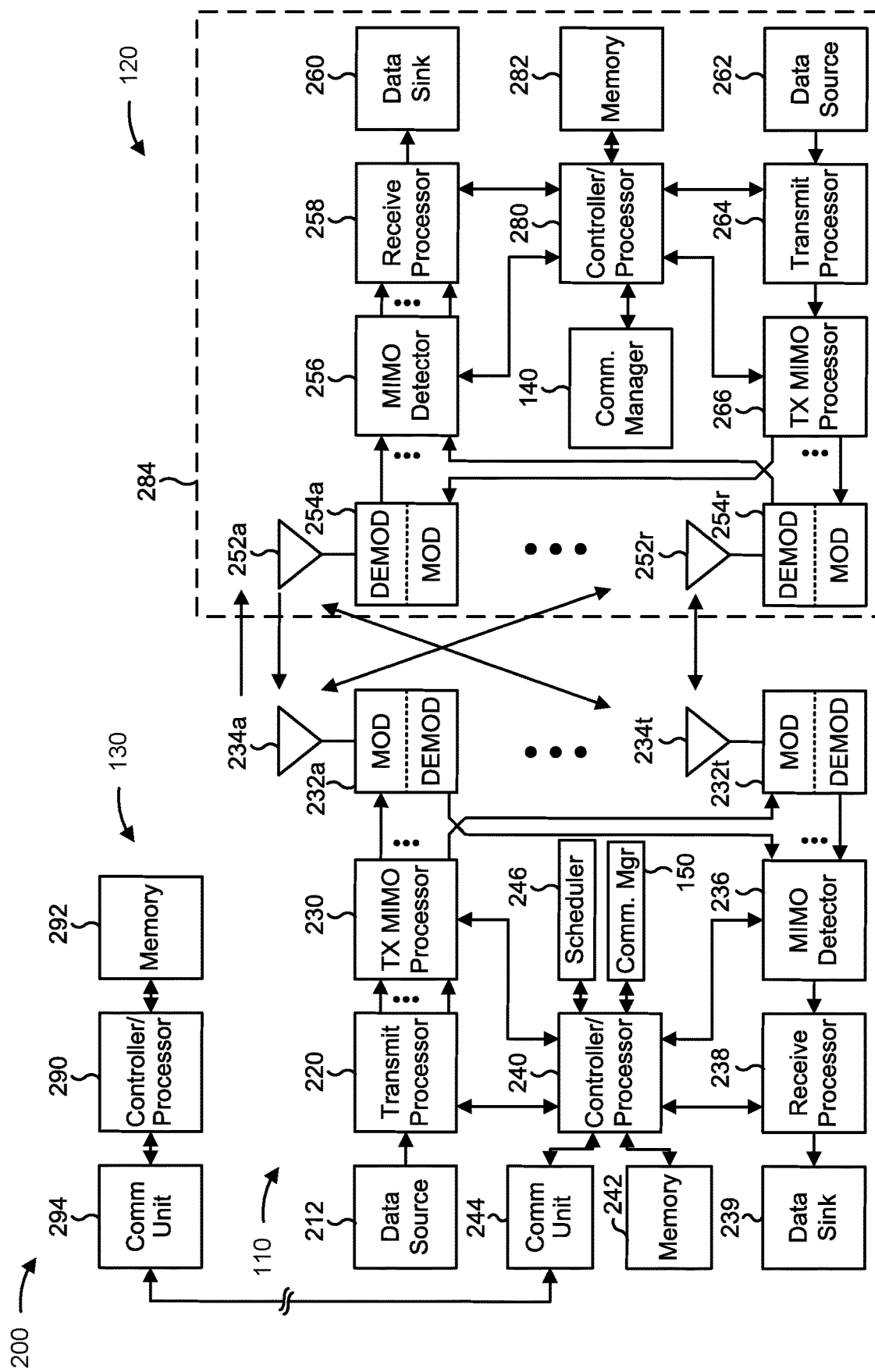
FIG. 2 is a diagram illustrating an example of a base station in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-14).

Controller/processor 240 of base station 110, controller/processor 280 of UE 120, and/or any other component(s) of FIG. 2 may perform one or more techniques associated with DCI for NR licensed operation and NR unlicensed operation in high frequency bands, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for receiving, for NR licensed operation, DCI that includes one or more bits for LBT, and/or means for transmitting, without performing an LBT procedure, a communication based at least in part on the DCI. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a network entity (e.g., base station 110) includes means for generating, for NR licensed operation, DCI that includes one or more bits for LBT, and/or means for transmitting the DCI to a UE. The means for the network entity to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

In some aspects, the UE 120 includes means for obtaining information that indicates whether the UE is to operate in NR licensed mode or NR unlicensed mode, means for receiving DCI without LBT bit, means for performing, in connection with receiving the DCI, an LBT procedure if the information indicates that the UE 120 is to operate in NR unlicensed mode, and/or means for transmitting a communication based at least in part on the DCI.

In some aspects, the network entity includes means for transmitting, to a UE, DCI without LBT bits, and/or means for receiving, in NR unlicensed operation, a communication based at least in part on the DCI.

In some aspects, the UE 120 includes means for monitoring for DCI of a first length that includes one or more bits for LBT and for DCI of a second length that does not include LBT bits, if the UE 120 is configured to monitor for an SI-RNTI, means for receiving DCI, means for performing an LBT procedure if the received DCI includes the one or more LBT bits, and/or means for transmitting a communication based at least in part on the received DCI.

In some aspects, the UE 120 includes means for receiving a first DCI for NR licensed operation; means for receiving a second DCI for NR unlicensed operation, where the second DCI received for NR unlicensed operation is a same length as the first DCI received for NR licensed operation; and/or means for transmitting, without performing an LBT procedure, a communication based at least in part on the first DCI.

In some aspects, the network entity includes means for generating a first DCI for NR licensed operation by extending a length of the first DCI to be a same length as a second DCI that is used for NR unlicensed operation; and/or means for transmitting the first DCI to a UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may operate in high frequency bands, such as between 52.6 gigahertz (GHz) and 71 GHz. The UE may transmit and receive communications according to a sub-carrier spacing (SCS) of 120 kilohertz (kHz), 480 kHz, or 960 kHz. In these higher frequency bands, the UE may also support up to 64 synchronization signal block (SSB) beams. Notably, both NR licensed and NR unlicensed (NR-U) systems may operate at these higher frequency bands.

A network may transmit a master information block (MIB) to UEs in order to provide information for network access. The contents and fields of the MIB may be shared between both NR licensed spectrum and NR unlicensed spectrum. However, there are not enough extra bits in the MIB to indicate to a UE whether a system is operating in NR licensed mode or NR unlicensed mode. The UE may not know whether the system in operating in NR licensed mode or NR unlicensed mode until the UE receives a system information block (SIB), such as a SIB1, or other remaining minimum system information.

In fallback DCI format 0_0 and DCI format 1_0, the DCI may include a 2-bit field that is specific only to NR unlicensed operation. For example, a ChannelAccess-Cpext field in DCI may include 2 bits that indicate a combination of channel access type and cyclic prefix extension as defined in Table 7.3.1.1.1-4 of 3GPP technical specification (TS) 38.212 for operation in a cell with shared spectrum channel access. Otherwise, the DCI may include 0 bits for NR unlicensed operation. The 2 bits for NR unlicensed operation may also be referred to as "LBT bits," because NR unlicensed operation may require the UE to perform a successful LBT procedure before transmission.

In a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as an LBT procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as a UE, an IoT device, or a wireless local area network (WLAN) device, among other examples). The channel access procedure may include sensing or measuring the physical channel (e.g., performing an RSRP measurement, detecting an energy level, or performing another type of measurement) during a channel access gap (which may also be referred to as a contention window) and determining whether the shared or unlicensed channel is free or busy based at least in part on the signals sensed or measured on the physical channel (e.g., based at least in part on whether the measurement satisfies a threshold). If the transmitting device determines that the channel access procedure was successful, the transmitting device may perform one or more transmissions on the shared or unlicensed channel during a transmission opportunity, which may extend for a channel occupancy time.

Because DCI for NR unlicensed operation may include the 2 LBT bits and DCI for NR licensed operation may not include the 2 LBT bits, the length of DCI for NR unlicensed operation may be different than the length of DCI for NR licensed operation. In spectrums less than 52.6 GHz, the UE may determine whether the system is operating in NR licensed mode or NR unlicensed mode based on which frequency band is used. However, this is not possible for frequency bands between 52.6 GHz and 71 GHz, because each frequency band may be used for either NR licensed operation or NR unlicensed operation. As a result, the UE has to decode DCI for 2 possible lengths. This complicates the monitoring of the UE and causes the UE to consume additional processing resources.

According to various aspects described herein, a UE may reduce the processing involved with monitoring for DCI in spectrum shared between NR licensed operation and NR unlicensed operation. In some aspects, a network entity (e.g., base station) may transmit and the UE may receive DCI that is the same length, whether the DCI is for NR licensed operation or NR unlicensed operation. For example, the DCI for NR licensed operation may be extended in length to be a same length as DCI for NR unlicensed operation. In another example, the DCI may include one or more bits for NR unlicensed operation (e.g., 2 LBT bits) in DCI for both NR licensed operation and NR unlicensed operation. The UE may ignore the LBT bits if operating in NR licensed mode. In this way, the UE does not have to monitor for 2 different DCI lengths. This reduces complexity and may cause the UE to conserve processing resource.

In some aspects, the UE may use other information to determine whether to operate in an NR licensed mode or an NR unlicensed mode. In this way, the DCI may exclude the LBT bits in DCI for NR unlicensed mode. The UE may monitor for and process just one length of DCI. The UE may still perform LBT as needed if the UE is operating in NR unlicensed mode. Using the other information rather than multiple DCI lengths may reduce complexity and resource consumption.

In some aspects, the UE may monitor for different DCI lengths for only part of the time or for only a subset of instances. For example, the UE may monitor for different DCI lengths only when the UE is monitoring for a specific RNTI, such as an SI-RNTI, and when LBT is to be used for NR unlicensed operation. Otherwise, the UE may monitor for only one of the DCI lengths. In this way, the UE conserves processing resources.

Figure 3:
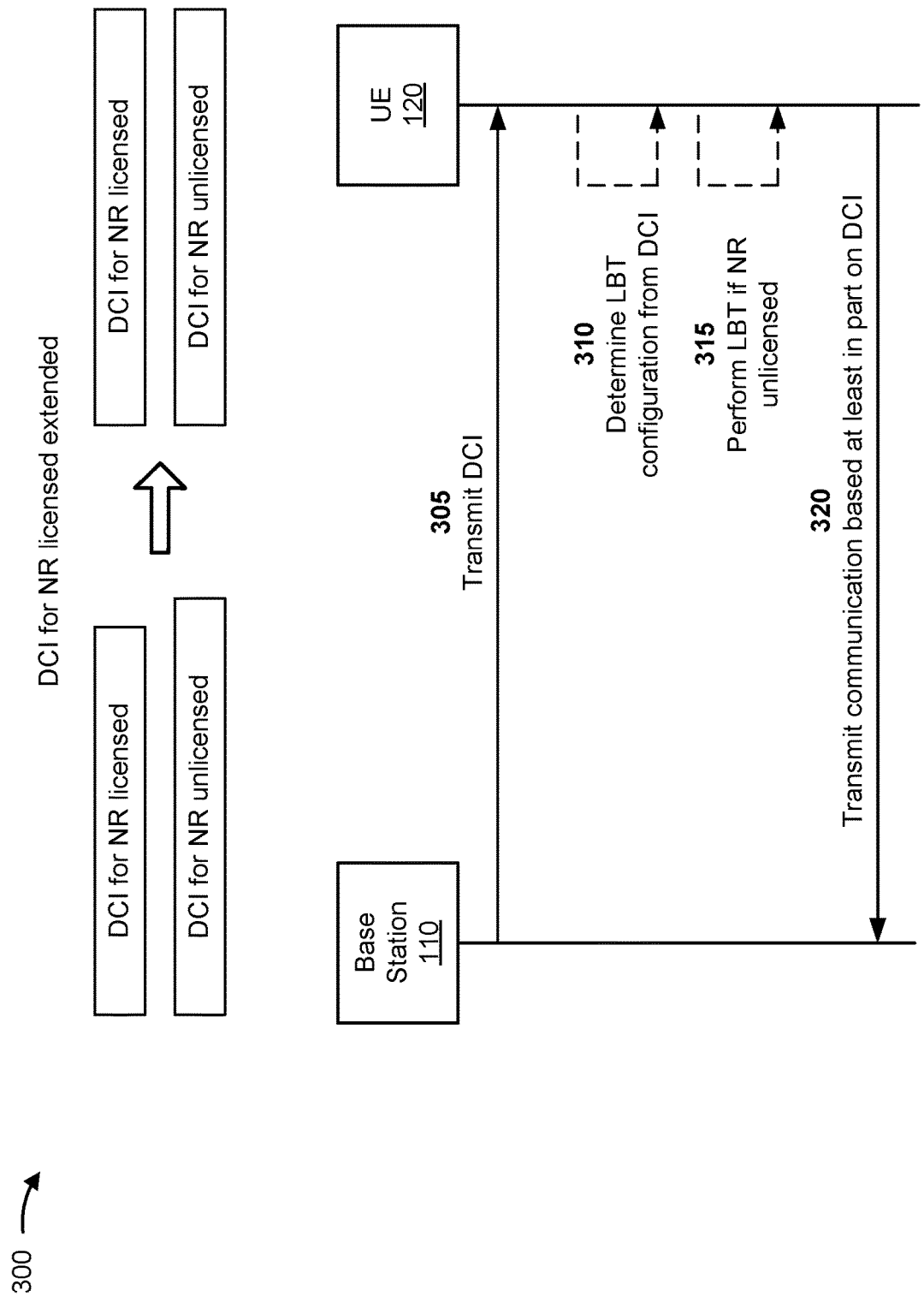
FIG. 3 is a diagram illustrating an example associated with using downlink control information (DCI) for New Radio (NR) licensed operation and NR unlicensed operation in high frequency bands, in accordance with the present disclosure.

FIG. 3 is a diagram illustrating an example 300 associated with using DCI for NR licensed operation and NR unlicensed operation in high frequency bands, in accordance with the present disclosure. As shown in FIG. 3, a base station 110 and a UE 120 may communicate with one another in a wireless network (e.g., wireless network 100). The base station 110 may be operating in a frequency band between 52.6 GHz and 71 GHz.

The base station 110 may use DCI to schedule a communication from the UE 120. The DCI may be DCI format 0_0 or DCI format 1_0. The base station 110 may be operating in either an NR licensed mode or NR unlicensed mode. For example, the base station 110 may prepare to transmit DCI for NR licensed operation.

As shown by reference number 305, the base station 110 may transmit the DCI to the UE 120. In order to reduce DCI monitoring complexity for the UE 120, the DCI for NR licensed operation may include one or more bits (e.g., 2 LBT bits even though LBT bits are normally for only NR unlicensed operation). For example, the UE 120 may add LBT bits to DCI for NR licensed operation such that a length of the DCI for NR licensed operation is the same length as DCI for NR unlicensed operation. The one or more LBT bits added to the DCI for NR licensed operation may be blank or zeroed bits. The added bits may be considered LBT bits because the bits are used to match the quantity of LBT bits that are included in DCI for NR unlicensed operation. In other words, the base station 110 may add bits to extend the DCI for NR licensed operation and thus align a length of DCI for NR licensed operation with a length of DCI for NR unlicensed operation. In this way, the UE 120 may perform a single length hypothesis for DCI.

The UE 120 may receive the DCI after monitoring for DCI that is the same length, whether for NR licensed operation or for NR unlicensed operation. If the DCI has, for example, blank or zeroed LBT bits, the UE 120 may determine to operate in NR licensed mode. The UE 120 may ignore the added LBT bits when the UE 120 is to operate in NR licensed mode (LBT is not performed in NR licensed mode).

Alternatively, the UE 120 may determine to operate in NR unlicensed mode if the DCI has non-zeroed LBT bits for NR unlicensed operation. As shown by optional reference number 310, if the DCI is for NR unlicensed operation, the UE 120 may determine an LBT configuration from a value of the LBT bits in the DCI.

As shown by reference number 315, if the UE 120 is operating in NR unlicensed mode, the UE 120 may perform an LBT procedure. As shown by reference number 320, the UE 120 may transmit the communication based at least in part on the DCI. In NR unlicensed mode, the UE 120 may transmit the communication if the LBT procedure is successful (the channel is clear).

In some aspects, as an alternative approach, the base station 110 may use different lengths of DCI for NR licensed operation and NR unlicensed operation. However, the UE 120 may monitor for DCI of different lengths for only part of the time or for specified scenarios. For example, DCI received from the base station 110 may have a cyclic redundancy check (CRC) that is scrambled with the SI-RNTI, or another specified RNTI. The UE 120 may monitor for DCI 0_0 and DCI 1_0 of different lengths only if the UE 120 is monitoring for SI-RNTI and if LBT may be performed.

As indicated above, FIG. 3 is provided as an example. Other examples may differ from what is described with respect to FIG. 3.

Figure 4:
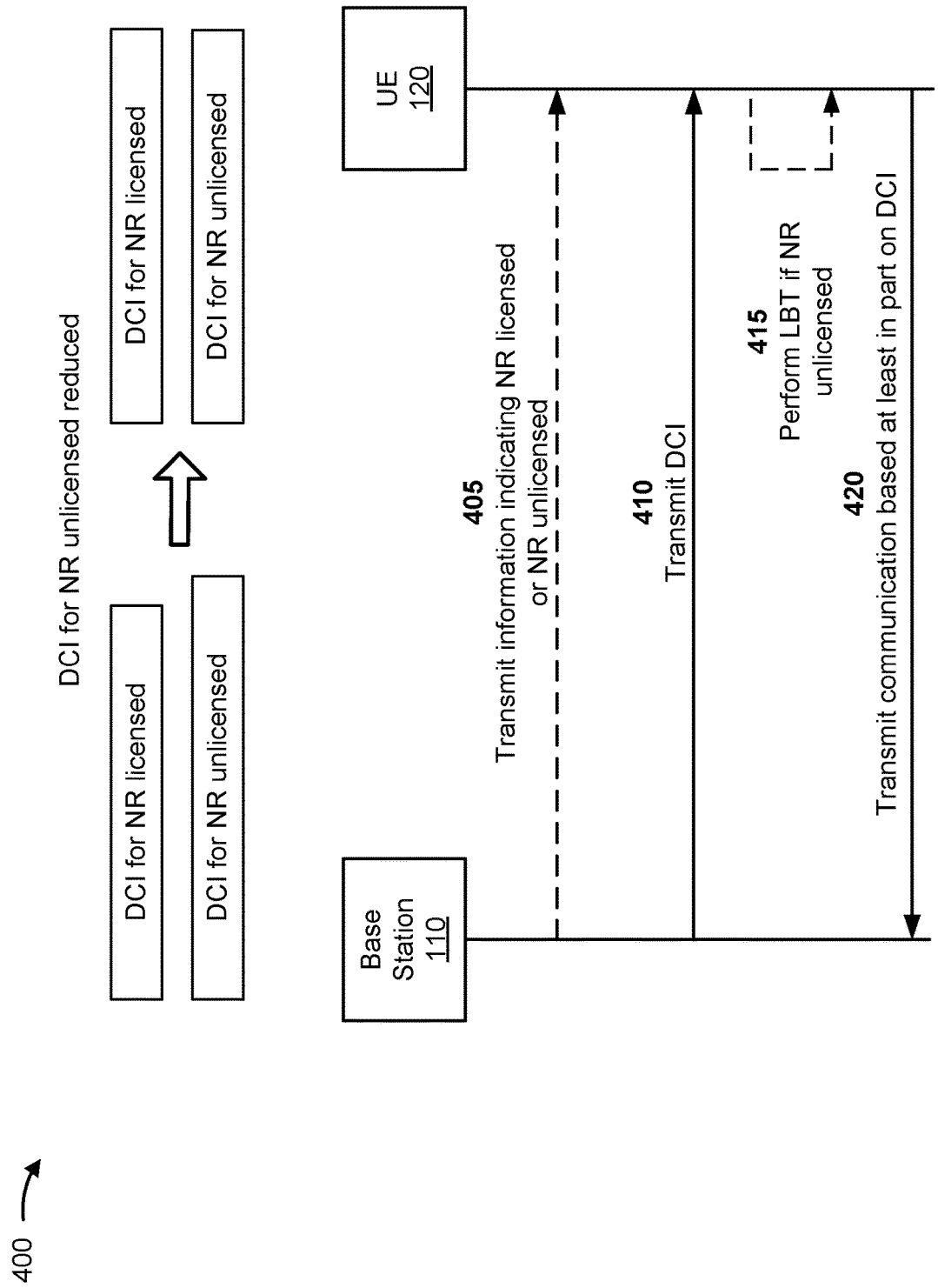
FIG. 4 is a diagram illustrating an example associated with using DCI for NR licensed operation and NR unlicensed operation in high frequency bands, in accordance with the present disclosure.

FIG. 4 is a diagram illustrating an example 400 associated with using DCI for NR licensed operation and NR unlicensed operation in high frequency bands, in accordance with the present disclosure. As shown in FIG. 4, a base station 110 and a UE 120 may communicate with one another in a wireless network (e.g., wireless network 100).

The UE 120 may obtain information indicating whether the UE 120 is to receive DCI for an NR licensed mode or an NR unlicensed mode. The information may be obtained from stored configuration information (by specification). Alternatively, or additionally, as shown by reference number 405, the base station 110 may transmit the information. The information may indicate, for example, that one channel raster (used for aligning transmission frequencies) indicates NR licensed operation and a different channel raster indicates NR unlicensed operation. In order to reduce the complexity of DCI monitoring by the UE 120, the DCI may not include LBT bits for NR unlicensed operation, such that the length of the DCI for NR unlicensed operation is the same as the length of the DCI for NR licensed operation.

As shown by reference number 410, the base station 110 may transmit the DCI to the UE 120. In example 400, the UE 120 may not use the DCI to determine whether the UE 120 is operate in an NR licensed mode or an NR unlicensed mode, because the UE 120 may have already received the prior information indicating NR licensed operation or NR unlicensed operation. There is no need for LBT bits. In other words, the base station 110 may not include LBT bits for NR unlicensed operation and thus align a length of DCI for NR unlicensed operation with a length of DCI for NR licensed operation. There may be no change in the length of DCI messages for NR licensed operation or when no LBT is to be performed.

As shown by reference number 415, if the UE 120 is operating in NR unlicensed mode, the UE 120 may perform an LBT procedure. As shown by reference number 420, the UE 120 may transmit the communication based at least in part on the DCI.

As indicated above, FIG. 4 is provided as an example. Other examples may differ from what is described with regard to FIG. 4.

Figure 5:
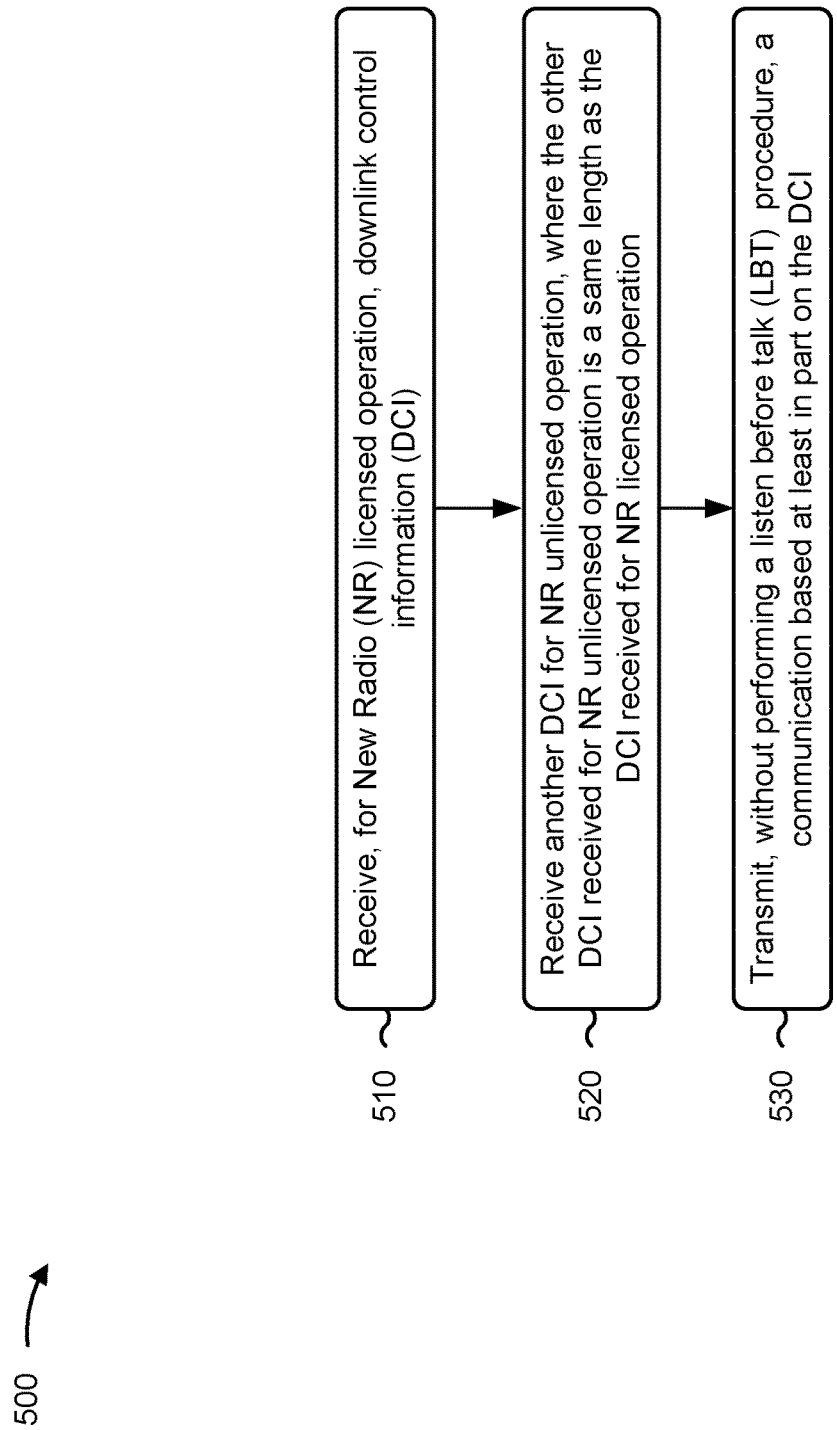
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with DCI for NR licensed operation and NR unlicensed operation in high frequency bands.

As shown in FIG. 5, in some aspects, process 500 may include receiving a first DCI for NR licensed operation (block 510). For example, the UE (e.g., using communication manager 140 and/or reception component 1002 depicted in FIG. 10) may receive a first DCI for NR licensed operation, as described above. In some aspects, the first DCI may include one or more bits for LBT.

As further shown in FIG. 5, in some aspects, process 500 may include receiving a second DCI for NR unlicensed operation, where the second DCI received for NR unlicensed operation is a same length as the first DCI received for NR licensed operation (block 520). For example, the UE (e.g., using communication manager 140 and/or reception component 1002 depicted in FIG. 10) may receive a second DCI for NR unlicensed operation, where the second DCI received for NR unlicensed operation is a same length as the first DCI received for NR licensed operation, as described above.

As further shown in FIG. 5, in some aspects, process 500 may include transmitting, without performing an LBT procedure, a communication based at least in part on the first DCI (block 530). For example, the UE (e.g., using communication manager 140 and/or transmission component 1004 depicted in FIG. 10) may transmit, without performing an LBT procedure, a communication based at least in part on the first DCI, as described above. In some aspects, process 500 may include receiving a communication based at least in part on the first DCI or the second DCI. The UE (e.g., using communication manager 140 and/or reception component 1002 depicted in FIG. 10) may receiving a communication based at least in part on the first DCI or the second DCI.

Process 500 may include additional aspects, such as any single aspect or any combination of aspects described below and/or in connection with one or more other processes described elsewhere herein.

In a first aspect, receiving the first DCI includes receiving the first DCI above a frequency of 52.6 GHz.

In a second aspect, alone or in combination with the first aspect, the first DCI is a DCI format 0_0 or DCI format 1_0.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
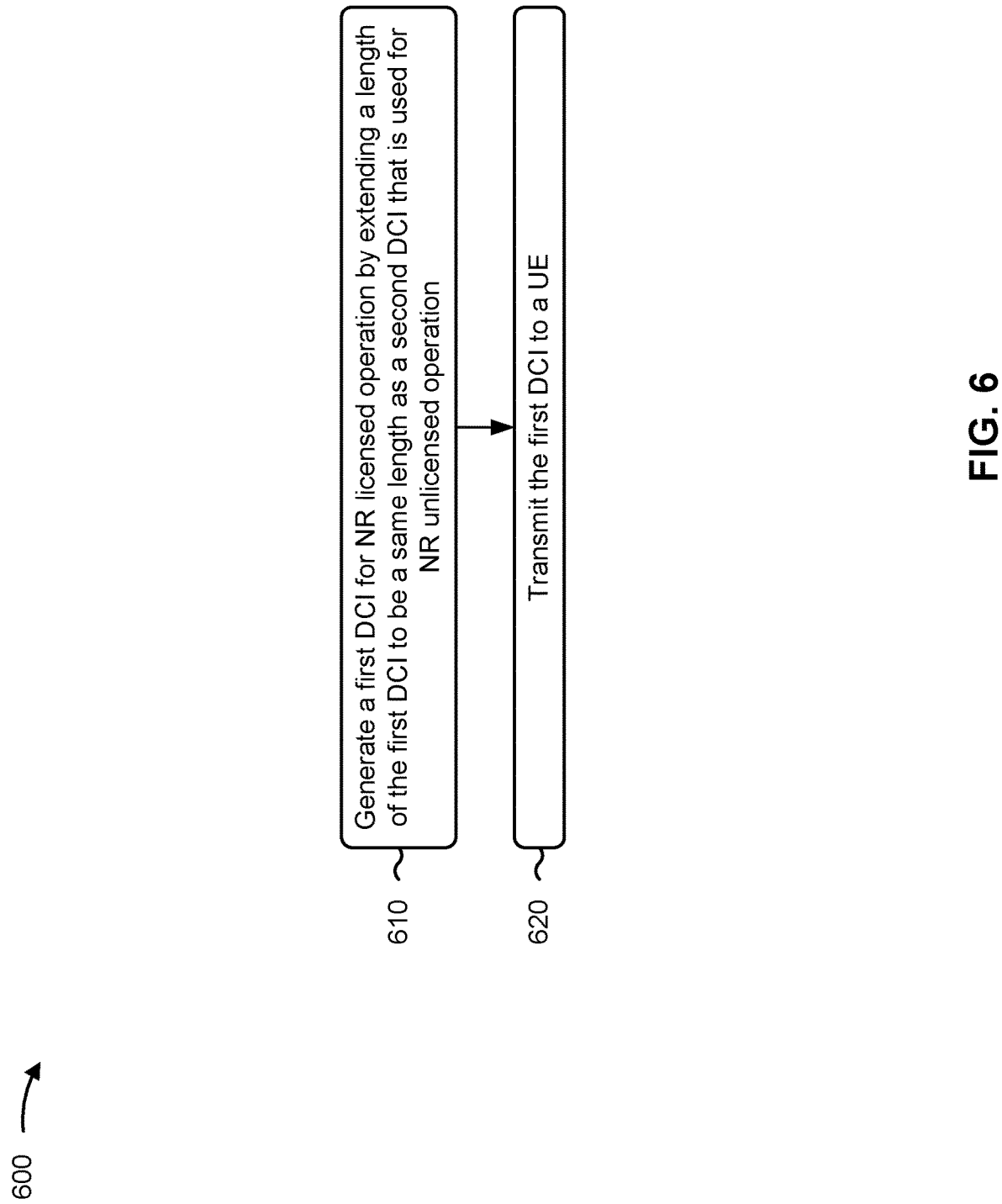
FIG. 6 is a diagram illustrating an example process performed, for example, by a network entity, in accordance with the present disclosure.

FIG. 6 is a diagram illustrating an example process 600 performed, for example, by a network entity, in accordance with the present disclosure. Example process 600 is an example where the network entity (e.g., base station 110) performs operations associated with DCI for NR licensed operation and NR unlicensed operation in high frequency bands.

As shown in FIG. 6, in some aspects, process 600 may include generating a first DCI for NR licensed operation by extending a length of the first DCI to be a same length as a second DCI that is used for NR unlicensed operation (block 610). For example, the network entity (e.g., using communication manager 150 and/or generation component 1108 depicted in FIG. 11) may generate a first DCI for NR licensed operation by extending a length of the first DCI to be a same length as a second DCI that is used for NR unlicensed operation, as described above. In some aspects, the first DCI may include one or more bits for LBT.

As further shown in FIG. 6, in some aspects, process 600 may include transmitting the first DCI to a UE (block 620). For example, the network entity (e.g., using communication manager 150 and/or transmission component 1104 depicted in FIG. 11) may transmit the first DCI to a UE, as described above.

Process 600 may include additional aspects, such as any single aspect or any combination of aspects described below and/or in connection with one or more other processes described elsewhere herein.

In a first aspect, generating the DCI includes generating the first DCI to be a same length as DCI that is used for NR unlicensed operation.

In a second aspect, alone or in combination with the first aspect, transmitting the first DCI includes transmitting the first DCI above a frequency of 52.6 gigahertz.

In a third aspect, alone or in combination with one or more of the first and second aspects, the first DCI is a DCI format 0_0 or DCI format 1_0.

In a fourth aspect, alone or in combination with one or more of the first through third aspects, process 600 includes transmitting the second DCI in NR unlicensed operation.

In a fifth aspect, alone or in combination with one or more of the first through fourth aspects, process 600 includes receiving a communication based at least in part on the first DCI.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
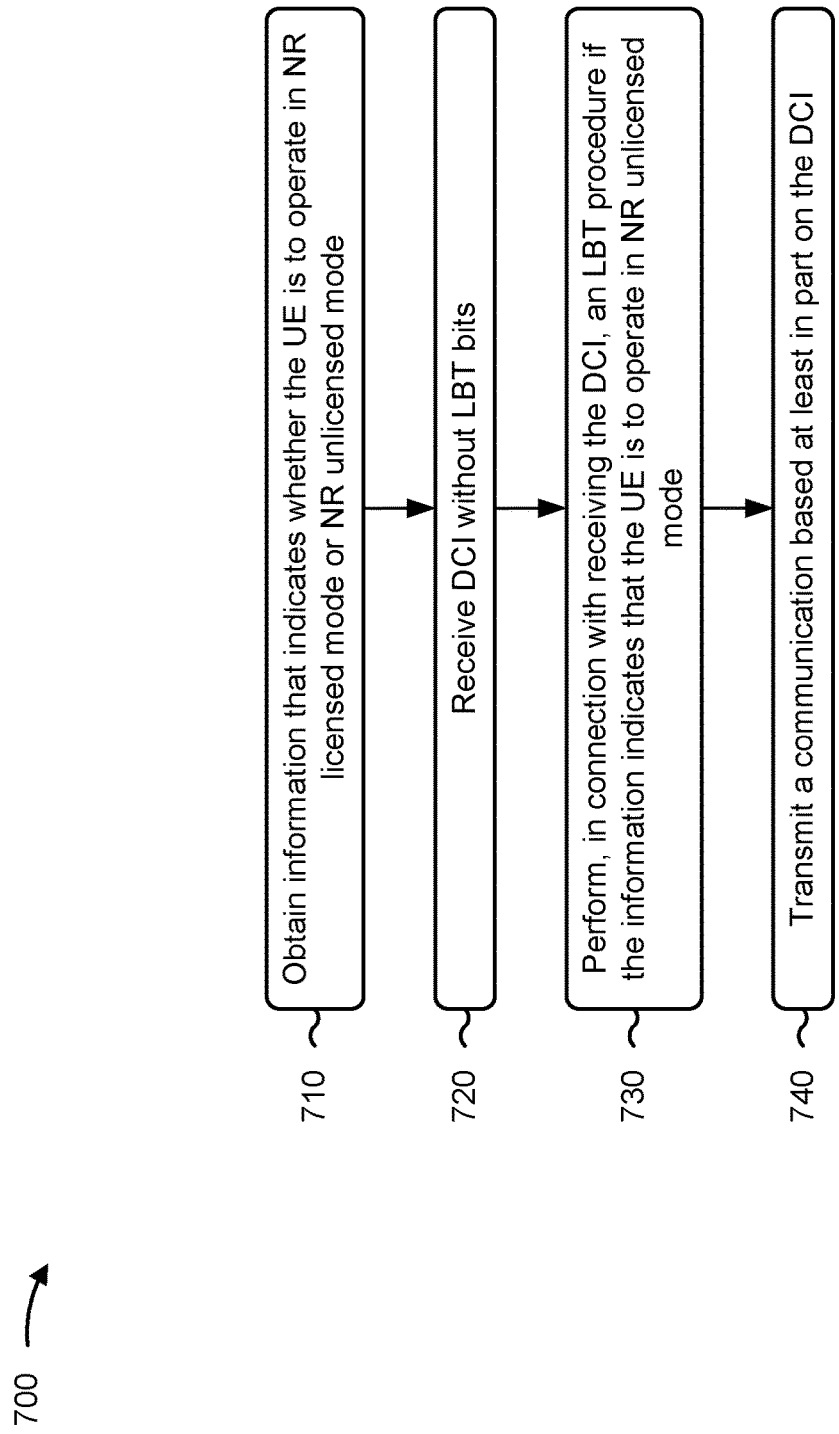
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with DCI for NR licensed operation and NR unlicensed operation in high frequency bands.

As shown in FIG. 7, in some aspects, process 700 may include obtaining information that indicates whether the UE is to operate in NR licensed mode or NR unlicensed mode (block 710). For example, the UE (e.g., using communication manager 140 and/or information component 1208 depicted in FIG. 12) may obtain information that indicates whether the UE is to operate in NR licensed mode or NR unlicensed mode, as described above.

As further shown in FIG. 7, in some aspects, process 700 may include receiving DCI without LBT bits (block 720). For example, the UE (e.g., using communication manager 140 and/or reception component 1202 depicted in FIG. 12) may receive DCI without LBT bits, as described above.

As further shown in FIG. 7, in some aspects, process 700 may include performing, in connection with receiving the DCI, an LBT procedure if the information indicates that the UE is to operate in NR unlicensed mode (block 730). For example, the UE (e.g., using communication manager 140 and/or reception component 1202 depicted in FIG. 12) may perform, in connection with receiving the DCI, an LBT procedure if the information indicates that the UE is to operate in NR unlicensed mode, as described above.

As further shown in FIG. 7, in some aspects, process 700 may include transmitting a communication based at least in part on the DCI (block 740). For example, the UE (e.g., using communication manager 140 and/or transmission component 1204 depicted in FIG. 12) may transmit a communication based at least in part on the DCI, as described above.

Process 700 may include additional aspects, such as any single aspect or any combination of aspects described below and/or in connection with one or more other processes described elsewhere herein.

In a first aspect, obtaining the information includes obtaining the information from stored configuration information.

In a second aspect, alone or in combination with the first aspect, obtaining the information includes receiving an indication from a network entity.

In a third aspect, alone or in combination with one or more of the first and second aspects, the information includes raster information that indicates whether the UE is to operate in NR licensed mode or NR unlicensed mode.

In a fourth aspect, alone or in combination with one or more of the first through third aspects, receiving the DCI includes receiving the DCI above a frequency of 52.6 GHz.

In a fifth aspect, alone or in combination with one or more of the first through fourth aspects, the DCI is a DCI format 0_0 or DCI format 1_0.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
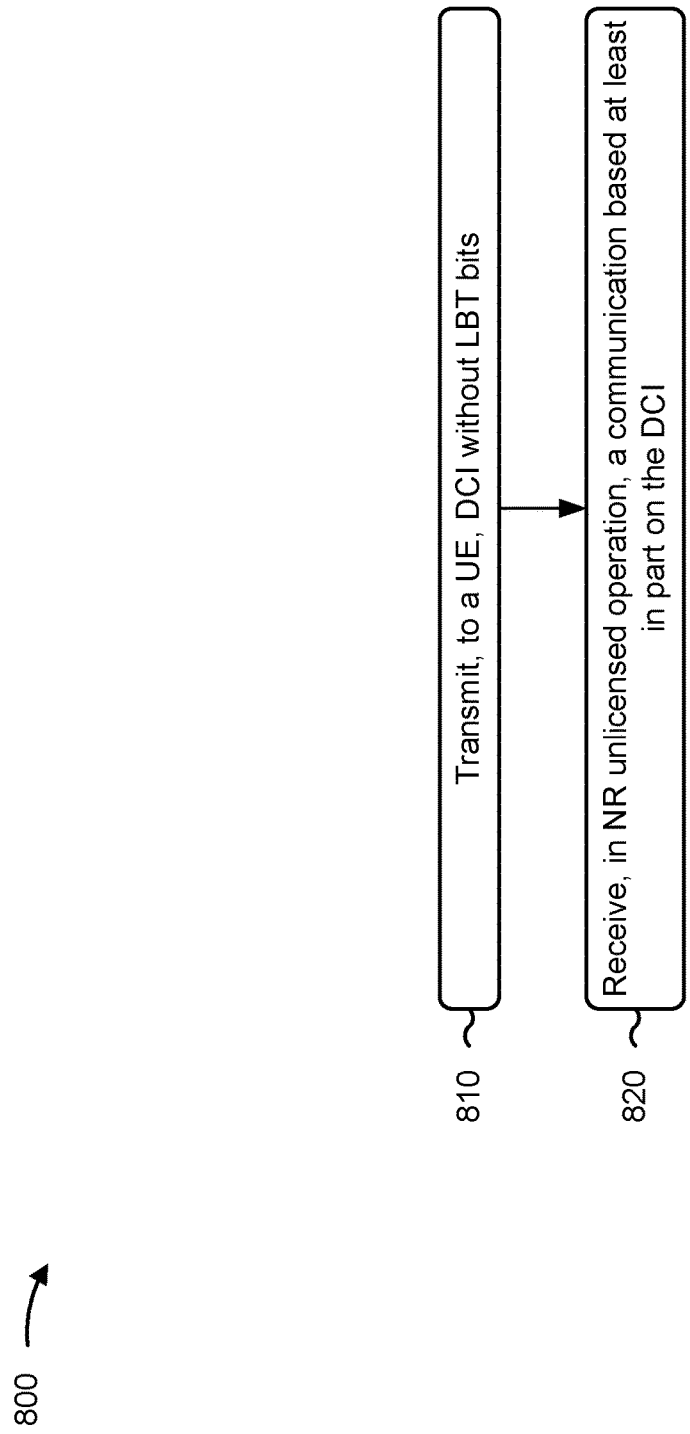
FIG. 8 is a diagram illustrating an example process performed, for example, by a network entity, in accordance with the present disclosure.

FIG. 8 is a diagram illustrating an example process 800 performed, for example, by a network entity, in accordance with the present disclosure. Example process 800 is an example where the network entity (e.g., base station 110) performs operations associated with DCI for NR licensed operation and NR unlicensed operation in high frequency bands.

As shown in FIG. 8, in some aspects, process 800 may include transmitting, to a UE, DCI without LBT bits (block 810). For example, the network entity (e.g., using communication manager 150 and/or transmission component 1304 depicted in FIG. 13) may transmit, to a UE, DCI without LBT bits, as described above.

As further shown in FIG. 8, in some aspects, process 800 may include receiving, in NR unlicensed operation, a communication based at least in part on the DCI (block 820). For example, the network entity (e.g., using communication manager 150 and/or reception component 1302 depicted in FIG. 13) may receive, in NR unlicensed operation, a communication based at least in part on the DCI, as described above.

Process 800 may include additional aspects, such as any single aspect or any combination of aspects described below and/or in connection with one or more other processes described elsewhere herein.

In a first aspect, process 800 includes transmitting information that indicates whether the UE is to operate in NR licensed mode or NR unlicensed mode.

In a second aspect, alone or in combination with the first aspect, the information includes raster information that indicates whether the UE is to operate in NR licensed mode or NR unlicensed mode.

In a third aspect, alone or in combination with one or more of the first and second aspects, transmitting the DCI includes transmitting the DCI above a frequency of 52.6 GHz.

In a fourth aspect, alone or in combination with one or more of the first through third aspects, the DCI is a DCI format 0_0 or DCI format 1_0.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
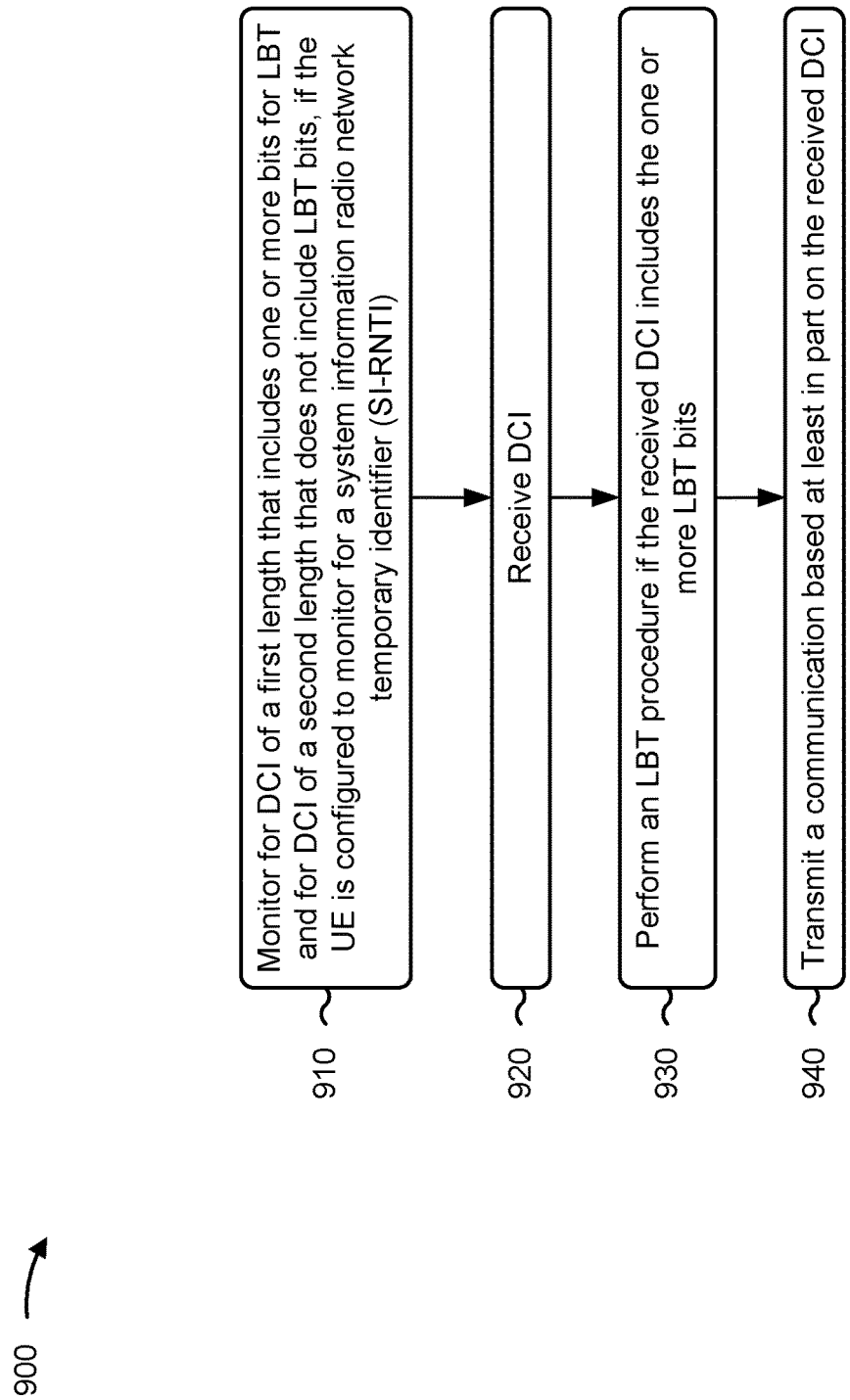
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with DCI for NR licensed operation and NR unlicensed operation in high frequency bands.

As shown in FIG. 9, in some aspects, process 900 may include monitoring for DCI of a first length that includes one or more bits for LBT and for DCI of a second length that does not include LBT bits, if the UE is configured to monitor for an SI-RNTI (block 910). For example, the UE (e.g., using communication manager 140 and/or monitoring component 1408 depicted in FIG. 13) may monitor for DCI of a first length that includes one or more bits for LBT and for DCI of a second length that does not include LBT bits, if the UE is configured to monitor for an SI-RNTI, as described above.

As further shown in FIG. 9, in some aspects, process 900 may include receiving DCI (block 920). For example, the UE (e.g., using communication manager 140 and/or reception component 1402 depicted in FIG. 14) may receive DCI, as described above.

As further shown in FIG. 9, in some aspects, process 900 may include performing an LBT procedure if the received DCI includes the one or more LBT bits (block 930). For example, the UE (e.g., using communication manager 140 and/or reception component 1402 depicted in FIG. 14) may perform an LBT procedure if the received DCI includes the one or more LBT bits, as described above.

As further shown in FIG. 9, in some aspects, process 900 may include transmitting a communication based at least in part on the received DCI (block 940). For example, the UE (e.g., using communication manager 140 and/or transmission component 1404 depicted in FIG. 14) may transmit a communication based at least in part on the received DCI, as described above.

Process 900 may include additional aspects, such as any single aspect or any combination of aspects described below and/or in connection with one or more other processes described elsewhere herein.

In a first aspect, receiving the DCI includes receiving the DCI above a frequency of 52.6 GHz.

In a second aspect, alone or in combination with the first aspect, the DCI is a DCI format 0_0 or DCI format 1_0.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
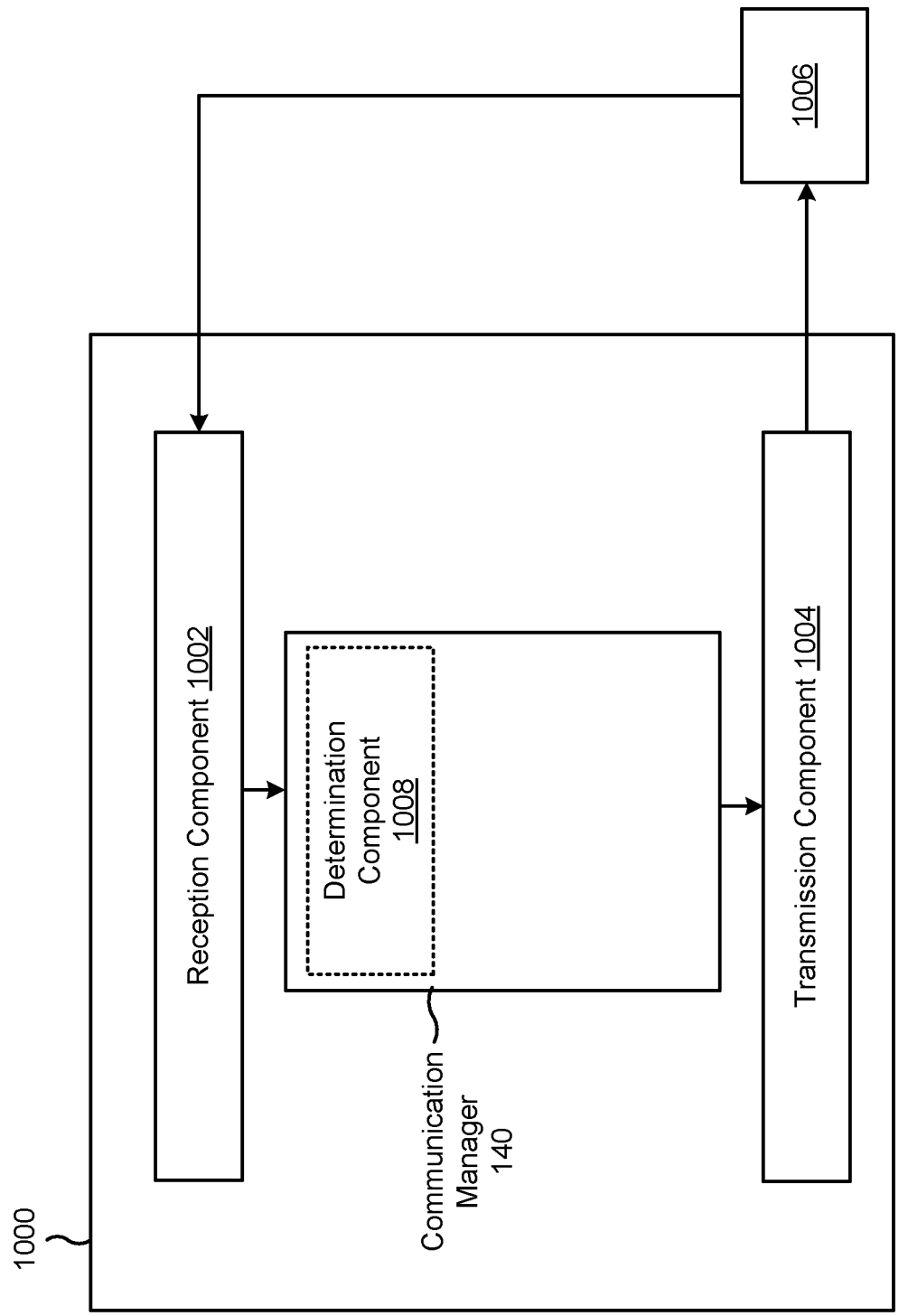
FIGS. 10-14 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, network entity, or another wireless communication device) using the reception component 1002 and the transmission component 1004. As further shown, the apparatus 1000 may include the communication manager 140. The communication manager 140 may include a determination component 1008, among other examples.

In some aspects, the apparatus 1000 may be configured to perform one or more operations described herein in connection with FIGS. 1-4. Additionally, or alternatively, the apparatus 1000 may be configured to perform one or more processes described herein, such as process 500 of FIG. 5. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1000. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, for NR licensed operation, DCI that includes one or more bits for LBT. The determination component 1008 may determine to ignore the one or more bits for LBT. The transmission component 1004 may transmit, without performing an LBT procedure, a communication based at least in part on the DCI.

In some aspects, the reception component 1002 may receive a first DCI for NR licensed operation and receive a second DCI for NR unlicensed operation, where the second DCI received for NR unlicensed operation is a same length as the first DCI received for NR licensed operation.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
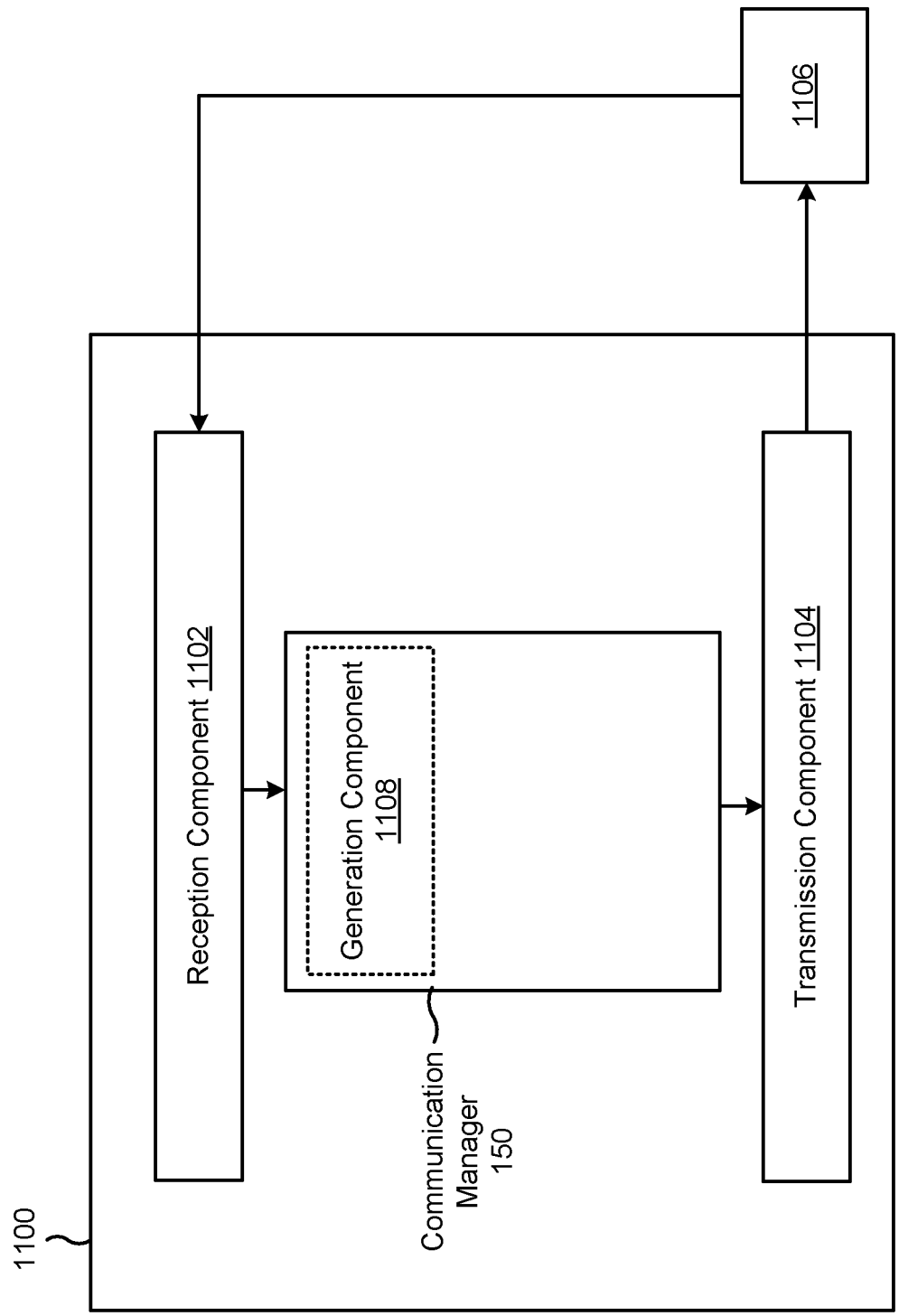

FIG. 11 is a block diagram of an example apparatus 1100 for wireless communication. The apparatus 1100 may be a network entity (e.g., base station), or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, network entity, or another wireless communication device) using the reception component 1102 and the transmission component 1104. As further shown, the apparatus 1100 may include the communication manager 150. The communication manager 150 may include a generation component 1108, among other examples.

In some aspects, the apparatus 1100 may be configured to perform one or more operations described herein in connection with FIGS. 1-4. Additionally, or alternatively, the apparatus 1100 may be configured to perform one or more processes described herein, such as process 600 of FIG. 6. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The generation component 1108 may generate, for NR licensed operation, DCI that includes one or more bits for LBT. The transmission component 1104 may transmit the DCI to UE. The reception component 1102 may receive a communication based at least in part on the DCI.

In some aspects, the generation component 1108 may a first DCI for NR licensed operation by extending a length of the first DCI to be a same length as a second DCI that is used for NR unlicensed operation. The transmission component 1104 may transmit the first DCI to UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
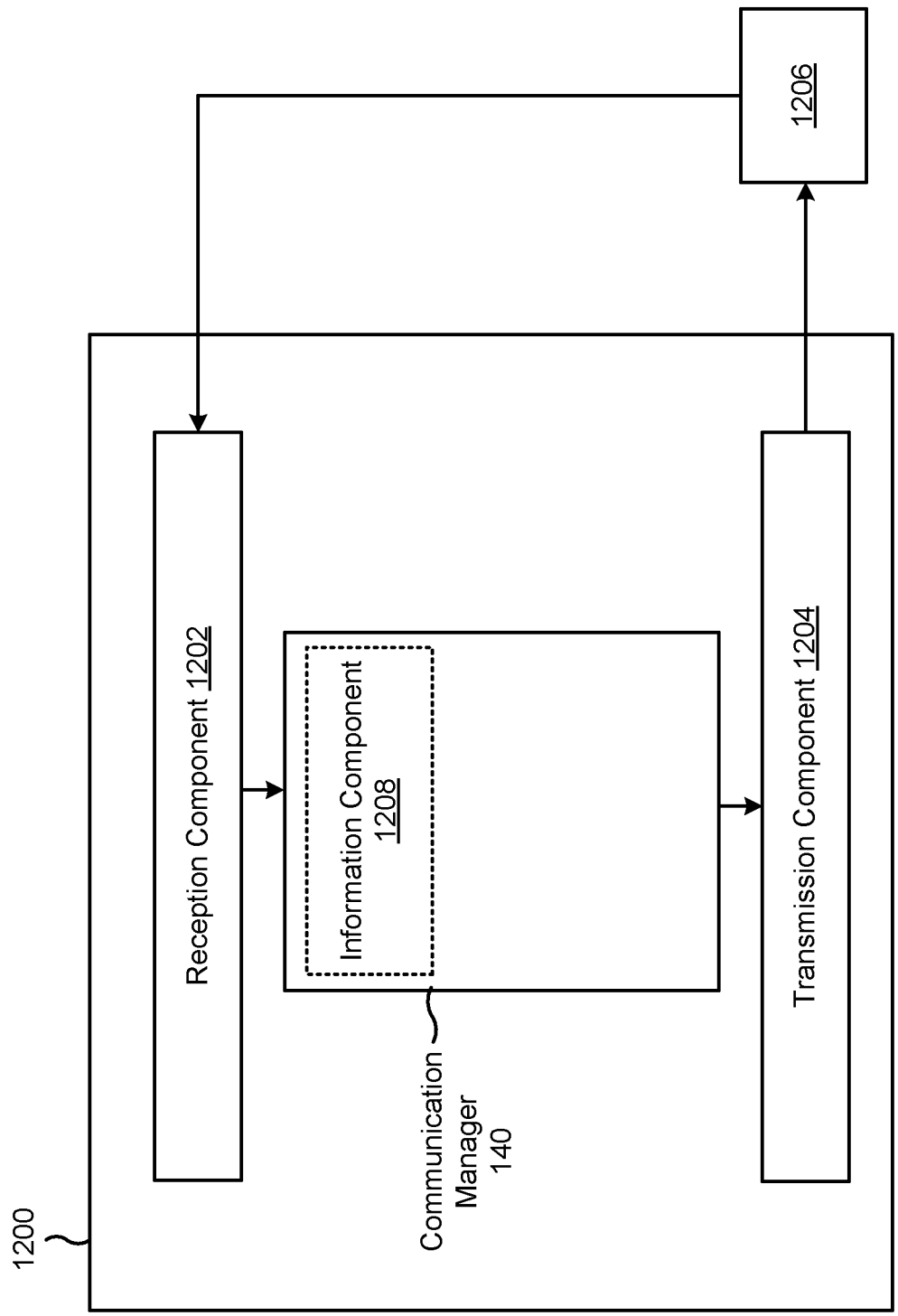

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include an information component 1208, among other examples.

In some aspects, the apparatus 1200 may be configured to perform one or more operations described herein in connection with FIGS. 1-4. Additionally, or alternatively, the apparatus 1200 may be configured to perform one or more processes described herein, such as process 700 of FIG. 7. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The information component 1208 may obtain information that indicates whether the UE is to operate in NR licensed mode or NR unlicensed mode. The reception component 1202 may receive DCI without LBT bits. The reception component 1202 may perform, in connection with receiving the DCI, an LBT procedure if the information indicates that the UE is to operate in NR unlicensed mode. The transmission component 1204 may transmit a communication based at least in part on the DCI.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
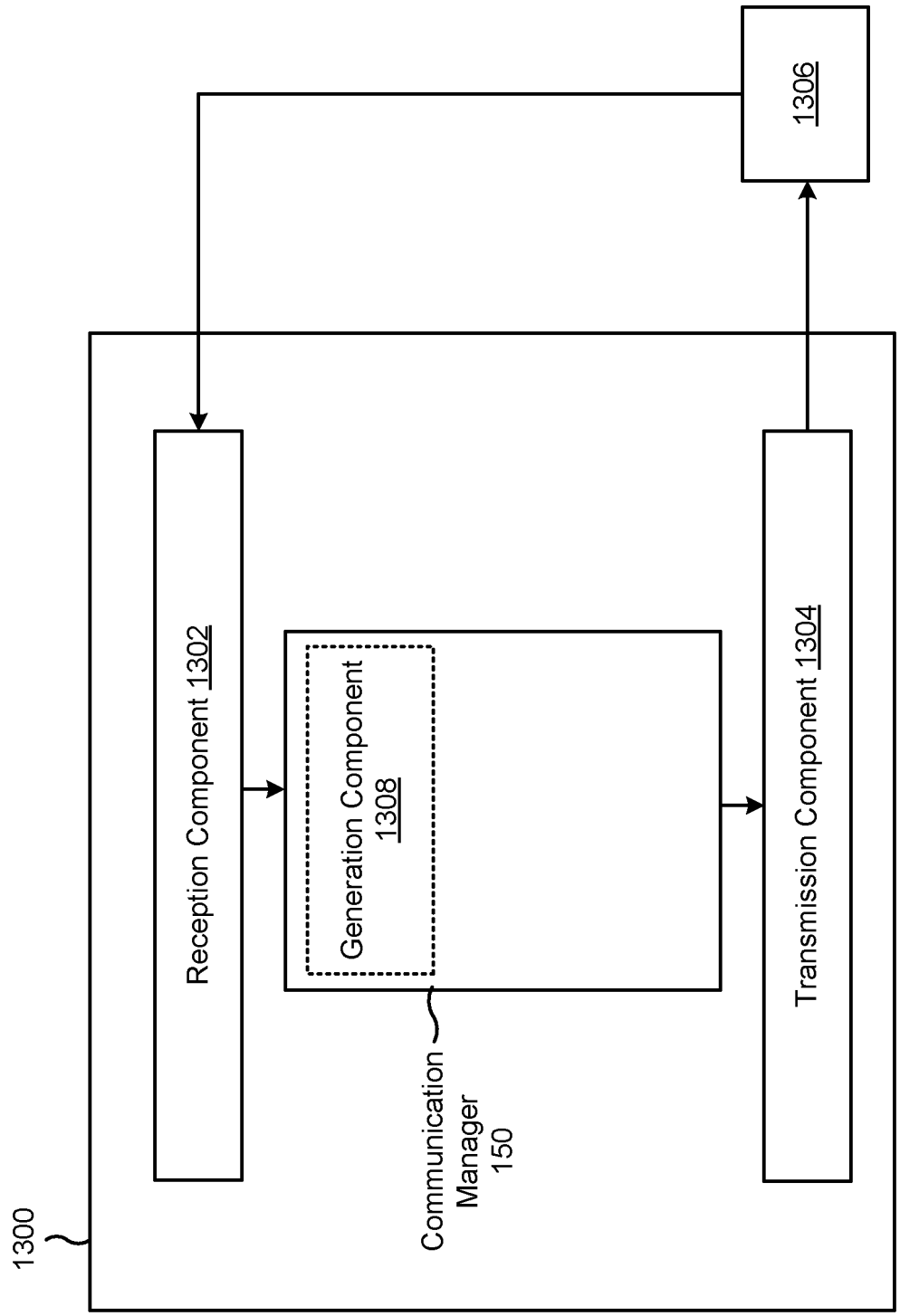

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a generation component 1308, among other examples.

In some aspects, the apparatus 1300 may be configured to perform one or more operations described herein in connection with FIGS. 1-4. Additionally, or alternatively, the apparatus 1300 may be configured to perform one or more processes described herein, such as process 800 of FIG. 8. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The generation component 1308 may generate DCI for NR unlicensed operation. The transmission component 1304 may transmit, to a UE, the DCI without LBT bits. This may include removing the LBT bits. The reception component 1302 may receive, in NR unlicensed operation, a communication based at least in part on the DCI.

The transmission component 1304 may transmit information that indicates whether the UE is to operate in NR licensed mode or NR unlicensed mode.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
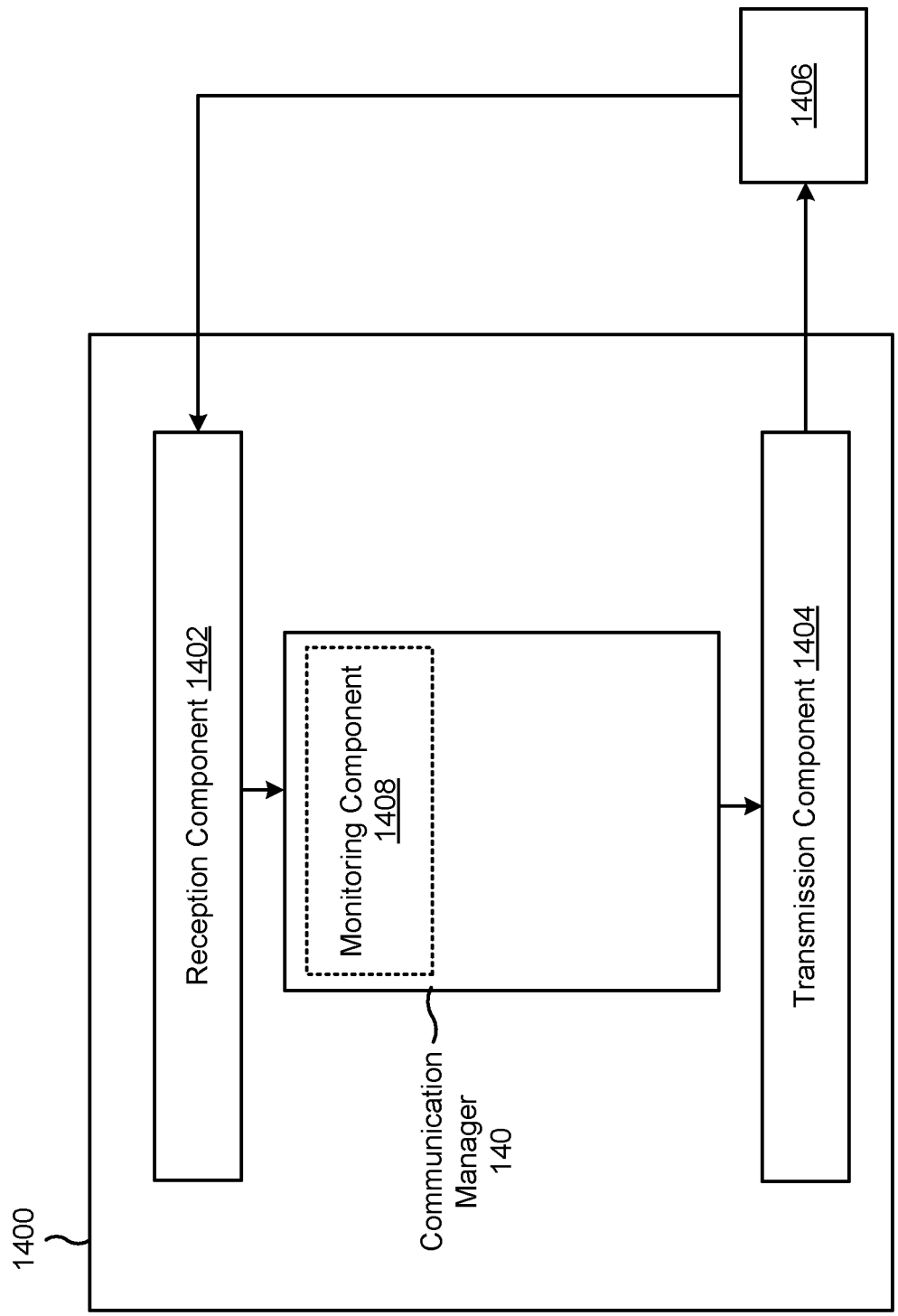

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include a monitoring component 1408, among other examples.

In some aspects, the apparatus 1400 may be configured to perform one or more operations described herein in connection with FIGS. 1-4. Additionally, or alternatively, the apparatus 1400 may be configured to perform one or more processes described herein, such as process 900 of FIG. 9. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The monitoring component 1408 may monitor for DCI of a first length that includes one or more bits for LBT and for DCI of a second length that does not include LBT bits, if the UE is configured to monitor for an SI-RNTI. The reception component 1402 may receive DCI. The reception component 1402 may perform an LBT procedure if the received DCI includes the one or more LBT bits. The transmission component 1404 may transmit a communication based at least in part on the received DCI.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, for New Radio (NR) licensed operation, downlink control information (DCI) that includes one or more bits for listen before talk (LBT); and transmitting, without performing an LBT procedure, a communication based at least in part on the DCI.

Aspect 2: The method of Aspect 1, wherein receiving the DCI includes receiving the DCI above a frequency of 52.6 gigahertz.

Aspect 3: The method of Aspect 1 or 2, wherein the DCI is a DCI format 0_0 or DCI format 1_0.

Aspect 4: The method of any of Aspects 1-3, further comprising, receiving another DCI for NR unlicensed operation, wherein the other DCI received for NR unlicensed operation is a same length as the DCI received for NR licensed operation.

Aspect 5: A method of wireless communication performed by a network entity, comprising: generating, for New Radio (NR) licensed operation, downlink control information (DCI) that includes one or more bits for listen before talk (LBT); and transmitting the DCI to a user equipment (UE).

Aspect 6: The method of Aspect 5, wherein generating the DCI includes generating the DCI to be a same length as DCI that is used for NR unlicensed operation.

Aspect 7: The method of Aspect 5 or 6, wherein transmitting the DCI includes transmitting the DCI above a frequency of 52.6 gigahertz.

Aspect 8: The method of any of Aspects 5-7, wherein the DCI is a DCI format 0_0 or DCI format 1_0.

Aspect 9: The method of any of Aspects 5-8, further comprising, transmitting, in NR unlicensed operation, another DCI, wherein the other DCI transmitted in NR unlicensed operation is a same length as the DCI transmitted in NR licensed operation.

Aspect 10: The method of any of Aspects 5-9, further comprising receiving a communication based at least in part on the DCI.

Aspect 11: A method of wireless communication performed by a user equipment (UE), comprising: obtaining information that indicates whether the UE is to operate in New Radio (NR) licensed mode or NR unlicensed mode; receiving downlink control information (DCI) without listen before talk (LBT) bits; performing, in connection with receiving the DCI, an LBT procedure if the information indicates that the UE is to operate in NR unlicensed mode; and transmitting a communication based at least in part on the DCI.

Aspect 12: The method of Aspect 11, wherein obtaining the information includes obtaining the information from stored configuration information.

Aspect 13: The method of Aspect 11 or 12, wherein obtaining the information includes receiving an indication from a network entity.

Aspect 14: The method of any of Aspects 11-13, wherein the information includes raster information that indicates whether the UE is to operate in NR licensed mode or NR unlicensed mode.

Aspect 15: The method of any of Aspects 11-14, wherein receiving the DCI includes receiving the DCI above a frequency of 52.6 gigahertz.

Aspect 16: The method of any of Aspects 11-15, wherein the DCI is a DCI format 0_0 or DCI format 1_0.

Aspect 17: A method of wireless communication performed by a network entity, comprising: transmitting, to a user equipment (UE), downlink control information (DCI) without listen before talk (LBT) bits; and receiving, in New Radio (NR) unlicensed operation, a communication based at least in part on the DCI.

Aspect 18: The method of Aspect 17, further comprising transmitting information that indicates whether the UE is to operate in NR licensed mode or NR unlicensed mode.

Aspect 19: The method of Aspect 18, wherein the information includes raster information that indicates whether the UE is to operate in NR licensed mode or NR unlicensed mode.

Aspect 20: The method of any of Aspects 17-19, wherein transmitting the DCI includes transmitting the DCI above a frequency of 52.6 gigahertz.

Aspect 21: The method of any of Aspects 17-20, wherein the DCI is a DCI format 0_0 or DCI format 1_0.

Aspect 22: A method of wireless communication performed by a user equipment (UE), comprising: monitoring for downlink control information (DCI) of a first length that includes one or more bits for listen before talk (LBT) and for DCI of a second length that does not include LBT bits, if the UE is configured to monitor for a system information radio network temporary identifier (SI-RNTI); receiving DCI; performing an LBT procedure if the received DCI includes the one or more LBT bits; and transmitting a communication based at least in part on the received DCI.

Aspect 23: The method of Aspect 22, wherein receiving the DCI includes receiving the DCI above a frequency of 52.6 gigahertz.

Aspect 24: The method of Aspect 22 or 23, wherein the DCI is a DCI format 0_0 or DCI format 1_0.

Aspect 25: A method of wireless communication performed by a user equipment (UE), comprising: receiving a first downlink control information (DCI) for New Radio (NR) licensed operation; receiving a second DCI for NR unlicensed operation, wherein the second DCI received for NR unlicensed operation is a same length as the first DCI received for NR licensed operation; and transmitting, without performing a Listen Before Talk (LBT) procedure, a communication based at least in part on the first DCI.

Aspect 26: The method of Aspect 25, wherein receiving the first DCI includes receiving the first DCI above a frequency of 52.6 gigahertz.

Aspect 27: The method of Aspect 25 or 26, wherein the first DCI is a DCI format 0_0 or DCI format 1_0.

Aspect 28: A method of wireless communication performed by a network entity, comprising: generating a first downlink control information (DCI) for New Radio (NR) licensed operation by extending a length of the first DCI to be a same length as a second DCI that is used for NR unlicensed operation; and transmitting the first DCI to a user equipment (UE).

Aspect 29: The method of Aspect 28, wherein transmitting the first DCI includes transmitting the first DCI above a frequency of 52.6 gigahertz.

Aspect 30: The method of Aspect 28 or 29, wherein the first DCI is a DCI format 0_0 or DCI format 1_0.

Aspect 31: The method of any of Aspects 28-30, further comprising transmitting the second DCI in NR unlicensed operation.

Aspect 32: The method of any of Aspects 28-31, further comprising receiving a communication based at least in part on the first DCI.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, above a frequency of 52.6 gigahertz, a first downlink control information (DCI) for New Radio (NR) licensed operation, the first DCI being a DCI format 1_0 and including one or more bits for channel access; and
   receiving a second DCI for NR unlicensed operation, wherein the second DCI is a same length as the first DCI.

2. The method of claim 1, further comprising:
   transmitting, without performing a listen before talk (LBT) procedure, a communication based at least in part on the first DCI.

3. The method of claim 1, further comprising:
   performing, in connection with receiving the second DCI, a channel access procedure when operating in an NR unlicensed mode.

4. The method of claim 1, further comprising:
   obtaining information that indicates whether to operate in an NR licensed mode or an NR unlicensed mode, wherein the information indicates a first channel raster corresponding to the NR licensed operation, or a second channel raster corresponding to the NR unlicensed operation.

5. A method of wireless communication performed by a network entity, comprising:
   generating a first downlink control information (DCI) for New Radio (NR) licensed operation by extending a length of the first DCI to be a same length as a second DCI that is used for NR unlicensed operation, the first DCI being a DCI format 1_0 and including one or more bits for channel access; and
   transmitting, above a frequency of 52.6 gigahertz, the first DCI to a user equipment (UE).

6. The method of claim 5, further comprising transmitting the second DCI in NR unlicensed operation.

7. The method of claim 5, further comprising receiving a communication based at least in part on the first DCI.

8. The method of claim 5, wherein generating the first DCI comprises adding blank or zeroed bits to the first DCI.

9. A user equipment (UE) for wireless communication, comprising:
   one or more memories; and
   one or more processors coupled to the one or more memories, the one or more processors configured to cause the UE to:
      receive, above a frequency of 52.6 gigahertz, a first downlink control information (DCI) for New Radio (NR) licensed operation, the first DCI being a DCI format 1_0 and including one or more bits for channel access; and
      receive a second DCI for NR unlicensed operation, wherein the second DCI is a same length as the first DCI.

10. The UE of claim 9, wherein the one or more processors are further configured to cause the UE to:
    transmit, without performing a listen before talk (LBT) procedure, a communication based at least in part on the first DCI.

11. The UE of claim 9, wherein the one or more processors are further configured to cause the UE to:
    perform, in connection with receiving the second DCI, a channel access procedure when operating in an NR unlicensed mode.

12. The UE of claim 9, wherein the one or more processors are further configured to cause the UE to:
    obtain information that indicates whether to operate in an NR licensed mode or an NR unlicensed mode.

13. The UE of claim 12, wherein the information indicates a first channel raster corresponding to the NR licensed operation, or a second channel raster corresponding to the NR unlicensed operation.

14. The UE of claim 9, wherein the one or more processors are further configured to cause the UE to:
    perform a channel access procedure when operating in an NR unlicensed mode corresponding to the NR unlicensed operation.

15. The UE of claim 9, wherein the one or more bits include at least one listen before talk (LBT) bit.

16. A network entity for wireless communication, comprising:
one or more memories; and
one or more processors coupled to the one or more memories, the one or more processors configured to cause the network entity to:
generate a first downlink control information (DCI) for New Radio (NR) licensed operation by extending a length of the first DCI to be a same length as a second DCI that is used for NR unlicensed operation, the first DCI being a DCI format 1_0 and including one or more bits for channel access; and
transmit, above a frequency of 52.6 gigahertz, the first DCI to a user equipment (UE).

17. The network entity of claim 16, wherein the one or more processors are further configured to cause the network entity to:
transmit the second DCI in NR unlicensed operation.

18. The network entity of claim 16, wherein the one or more processors are further configured to cause the network entity to:
receive a communication based at least in part on the first DCI.

19. The network entity of claim 16, wherein the one or more processors, to generate the first DCI, are configured to cause the network entity to:
add blank or zeroed bits to the first DCI.

* * * * *